United States Patent
Oyama et al.

(10) Patent No.: US 7,952,576 B2
(45) Date of Patent: May 31, 2011

(54) IMAGE PROCESSING APPARATUS AND METHOD THEREOF

(75) Inventors: Kiyoshi Oyama, Tokyo (JP); Eiji Toyosawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 832 days.

(21) Appl. No.: 11/958,926

(22) Filed: Dec. 18, 2007

(65) Prior Publication Data
US 2008/0150940 A1    Jun. 26, 2008

(30) Foreign Application Priority Data
Dec. 20, 2006 (JP) ................................ 2006-343496

(51) Int. Cl.
*G06T 17/00* (2006.01)
(52) U.S. Cl. ........................ 345/420; 345/441
(58) Field of Classification Search .................. 345/420, 345/441–443
See application file for complete search history.

(56) References Cited

U.S. PATENT DOCUMENTS

| | | | | |
|---|---|---|---|---|
| 4,791,583 A | * | 12/1988 | Colburn | 345/420 |
| 5,448,686 A | * | 9/1995 | Borrel et al. | 345/420 |
| 5,774,130 A | * | 6/1998 | Horikawa et al. | 345/441 |
| 5,966,140 A | * | 10/1999 | Popovic et al. | 345/441 |
| 7,646,384 B2 | * | 1/2010 | Anderson et al. | 345/420 |
| 7,675,515 B2 | * | 3/2010 | Uraki | 345/420 |
| 2004/0032408 A1 | * | 2/2004 | Doi et al. | 345/420 |

FOREIGN PATENT DOCUMENTS

| | | |
|---|---|---|
| JP | 62-72071 | 4/1987 |
| JP | 10-312473 | 11/1998 |

* cited by examiner

*Primary Examiner* — Xiao M Wu
*Assistant Examiner* — Charles Tseng
(74) *Attorney, Agent, or Firm* — Fitzpatrick, Cella, Harper & Scinto

(57) ABSTRACT

If a next endpoint in a line segment is determined to be neither in a first nor a second reference direction passing through a base endpoint, a point obtained by projecting the next endpoint onto a straight line in the first reference direction passing through the base endpoint or a straight line in the second reference direction passing through the base endpoint is set as a correction endpoint. If the next endpoint is determined to be in the first or second reference direction passing through the next endpoint, the next endpoint is set as a new base endpoint. If the next endpoint is determined to be in neither the first reference direction passing through the base endpoint nor the second reference direction, the correction endpoint is set as a new base endpoint. Each endpoint of the plurality of line elements is subjected to the above process so as to generate a simplified shape.

9 Claims, 22 Drawing Sheets

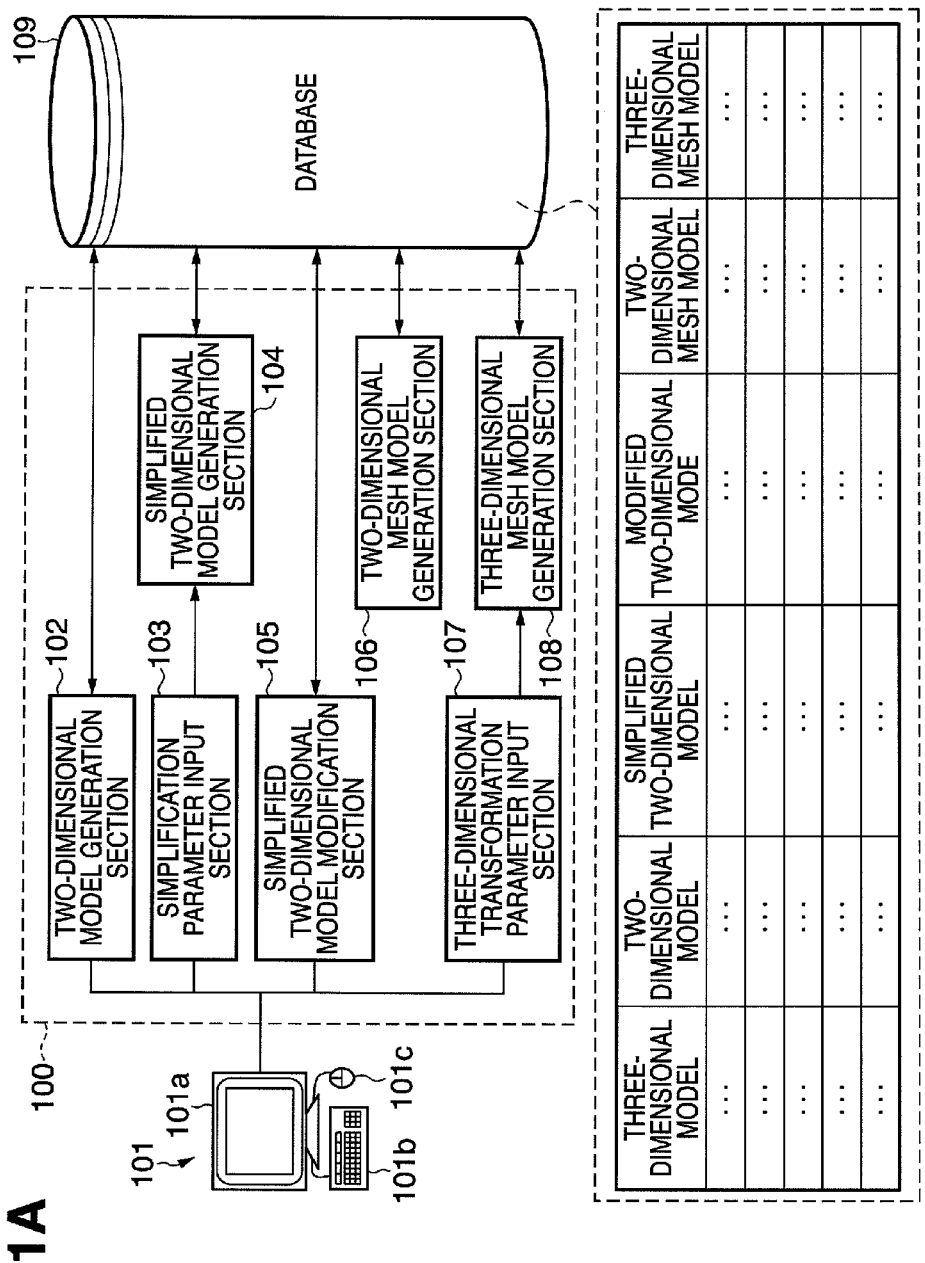

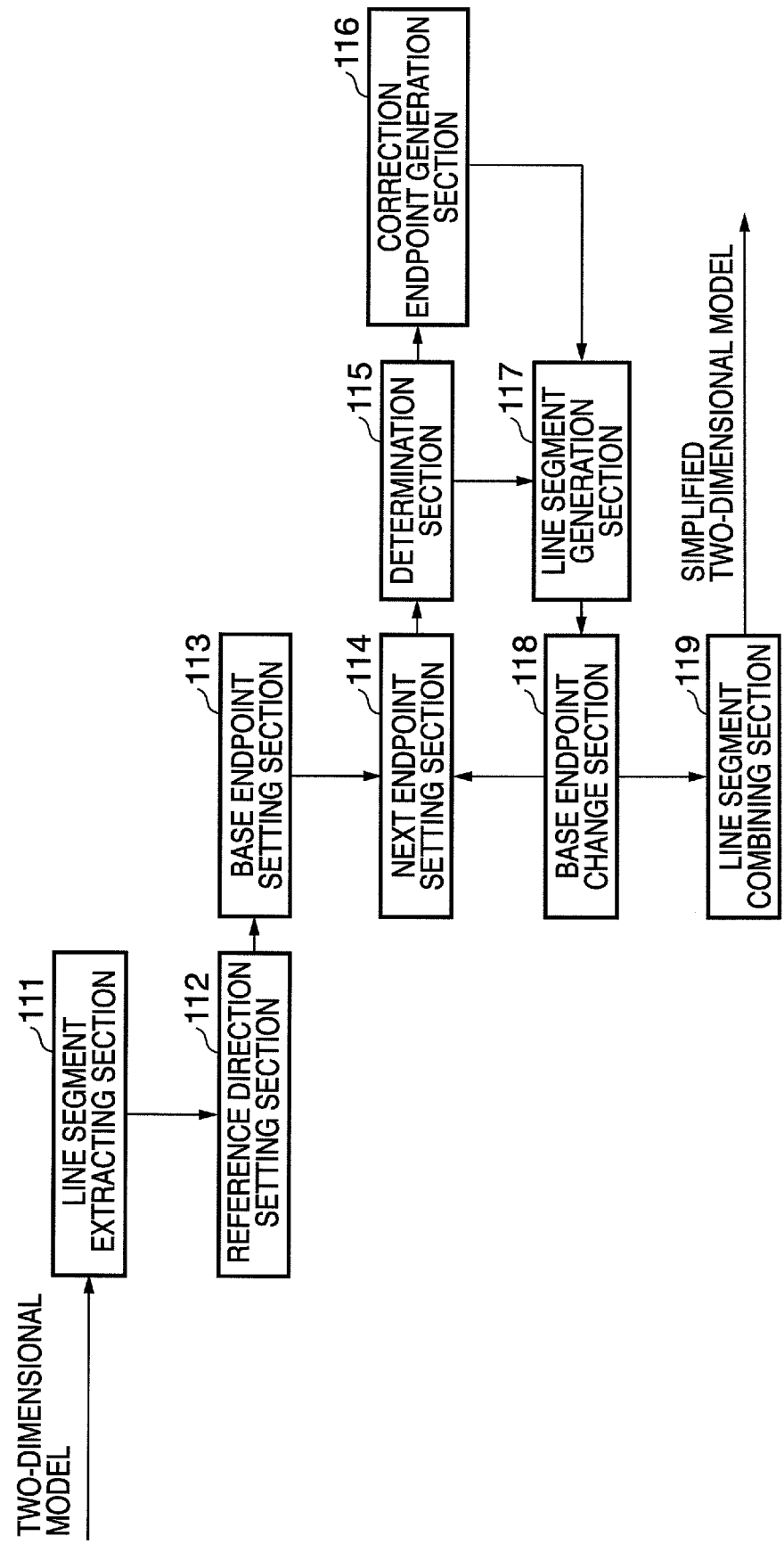

● BASE ENDPOINT
⊗ NEXT ENDPOINT CANDIDATE
○ CORRECTION ENDPOINT

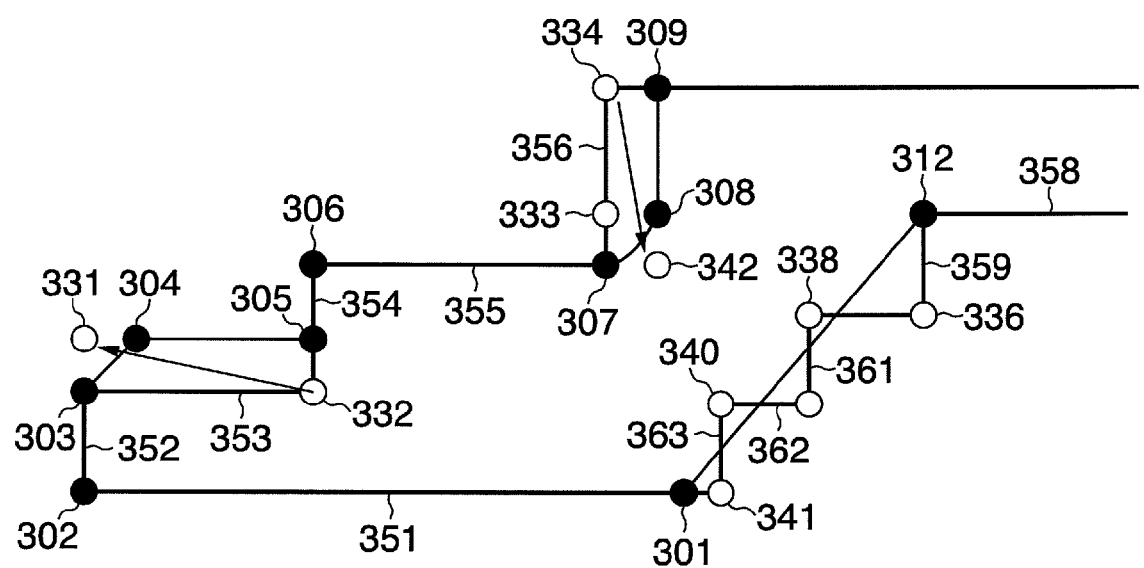
F I G. 14A

F I G. 15
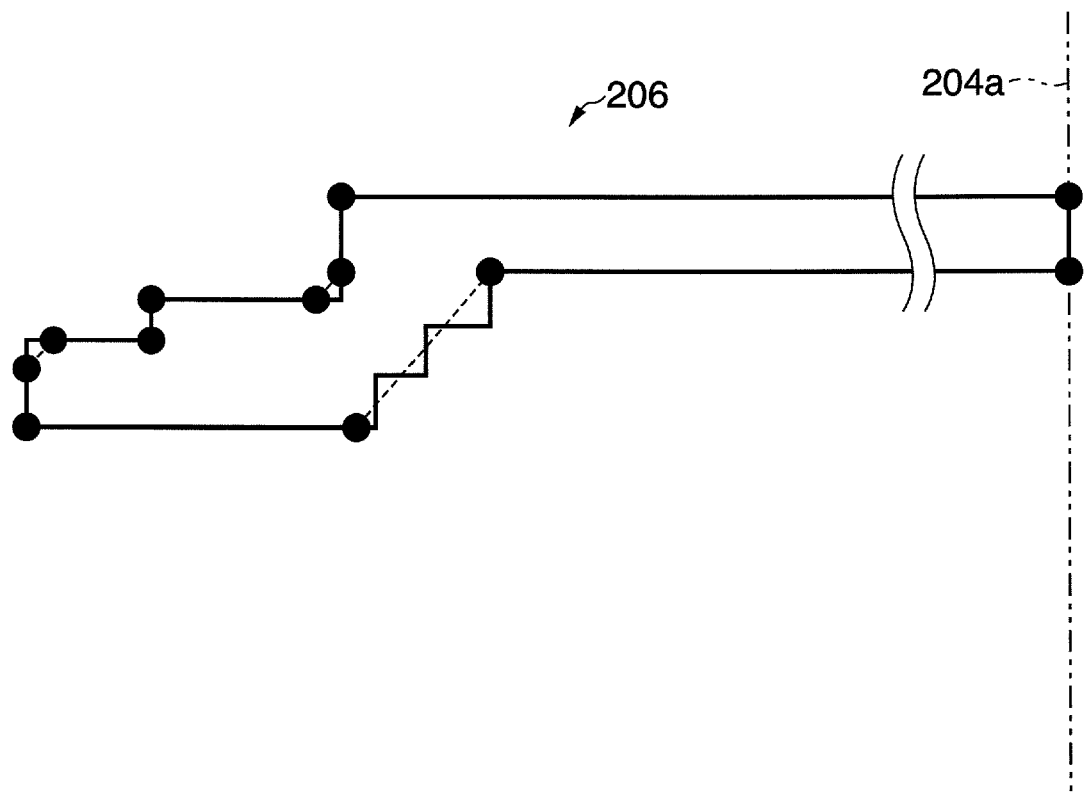

IMAGE PROCESSING APPARATUS AND METHOD THEREOF

BACKGROUND OF THE INVENTION

1. Field of the Invention

The present invention relates to an apparatus for simplifying two-dimensional shapes and a method thereof.

2. Description of the Related Art

Image processing apparatuses that simplify a two-dimensional shape including a plurality of line elements are conventionally known. For example, in order to shorten the time for analyzing three-dimensional CAD data, a technique is known in which two-dimensional shapes are extracted from three-dimensional CAD data, which are then simplified and analyzed (Japanese Patent Laid-Open No. S62-72071 (Document 1)). Furthermore, there is also a technique that simplifies two-dimensional shapes and then transforms them into three-dimensional form for the purpose of simplifying three-dimensional CAD data (Japanese Patent Laid-Open No. H10-312473 (Document 2)).

However, the conventional techniques impose an excessive burden on the users when simplifying the two-dimensional shapes. Also, according to the conventional techniques, the simplification is achieved only to the extent that very small curvatures can be ignored, so the simplification was not sufficient.

SUMMARY OF THE INVENTION

According to one aspect of the present invention, an image processing apparatus that simplifies a two-dimensional shape including a plurality of line elements, the apparatus comprises:

a base endpoint setting unit that sets one endpoint of one line element included in the two-dimensional shape as a base endpoint;

a next endpoint setting unit that sets the other endpoint of a line element including the base endpoint as a next endpoint;

a determination unit that determines whether or not the next endpoint is in a first reference direction passing through the base endpoint, or in a second reference direction orthogonal to the first reference direction;

a correction endpoint generation unit that generates, as a correction endpoint, a point obtained by projecting the next endpoint onto the straight line of the first reference direction passing through the base endpoint or onto the straight line of the second reference direction passing through the base endpoint in the case where the determination unit determines that the next endpoint is neither in the first reference direction nor in the second reference direction, which pass through the base endpoint; and a base endpoint change unit that sets the next endpoint as a new base endpoint in the case where the determination unit determines that the next endpoint is in the first reference direction or in the second reference direction, which pass through the base endpoint, and sets the correction endpoint as a new base endpoint in the case where the determination unit determines that the next endpoint is neither in the first reference direction nor in the second reference direction, which pass through the base endpoint, wherein each endpoint of the plurality of line elements included in the two-dimensional shape is subjected to the process performed by the next endpoint setting unit, the determination unit, the correction endpoint generation unit, and the base endpoint change unit so as to generate a simplified shape.

According to another aspect of the present invention, an image processing method for simplifying a two-dimensional shape including a plurality of line elements, the method comprises:

a base endpoint setting step of setting one endpoint of one line element included in the two-dimensional shape as a base endpoint;

a next endpoint setting step of setting the other endpoint of a line element including the base endpoint as a next endpoint;

a determination step of determining whether or not the next endpoint is in a first reference direction passing through the base endpoint or a second reference direction orthogonal to the first reference direction;

a correction endpoint generation step of generating, as a correction endpoint, a point obtained by projecting the next endpoint onto the straight line of the first reference direction passing through the base endpoint or onto the straight line of the second reference direction passing through the base endpoint in the case where it is determined in the determination step that the next endpoint is neither in the first reference direction nor in the second reference direction, which pass through the base endpoint; and a base endpoint change step of setting the next endpoint as a new base endpoint in the case where it is determined in the determination step that the next endpoint is in the first reference direction or in the second reference direction, which pass through the base endpoint, and setting the correction endpoint as a new base endpoint in the case where it is determined in the determination step that the next endpoint is neither in the first reference direction nor in the second reference direction, which pass through the base endpoint, wherein each endpoint of the plurality of line elements included in the two-dimensional shape is subjected to the process performed by the next endpoint setting step, the determination step, the correction endpoint generation step and the base endpoint change step so as to generate a simplified shape.

According to the present invention, it is possible to simplify two-dimensional shapes in a simple and easy manner.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1A is a block diagram illustrating the overall configuration of a system including an analysis model generation apparatus 100 as an image processing apparatus according to an embodiment of the present invention.

FIG. 1B is a block diagram illustrating an internal configuration of a simplified two-dimensional model generation section 104.

FIGS. 9 to 17 are diagrams showing states when the analysis model generation apparatus 100 is employed to simplify the roller 201.

DESCRIPTION OF THE EMBODIMENTS

Figure 1C:
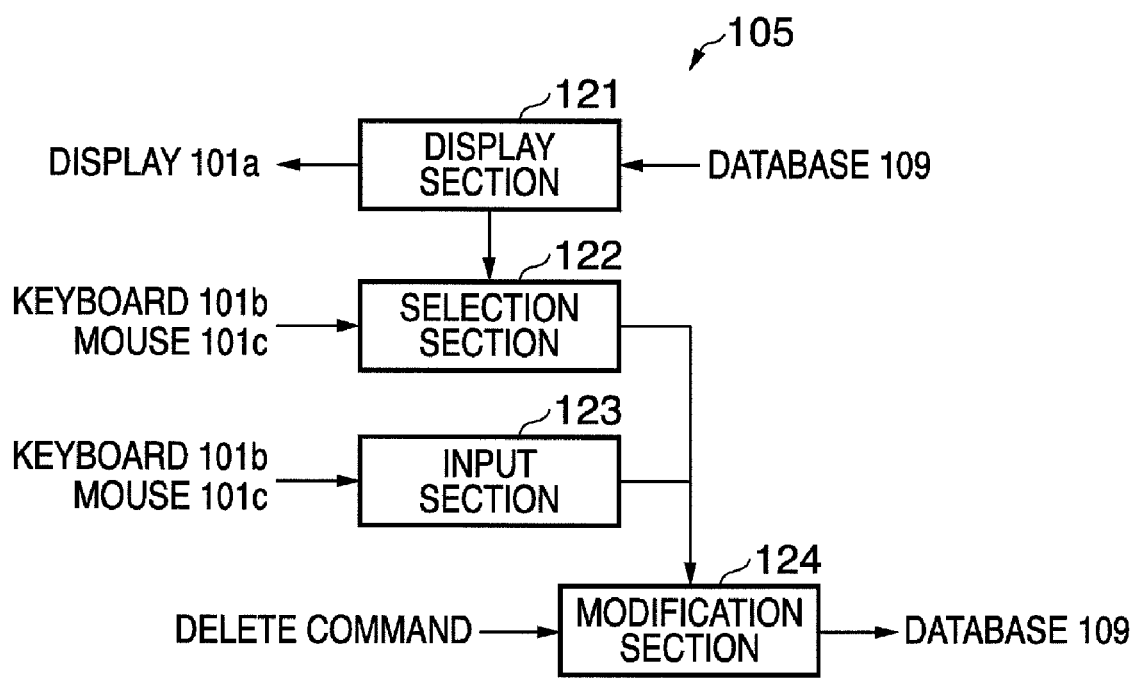
FIG. 1C is a block diagram illustrating an internal configuration of a simplified two-dimensional model modification section 105.

Hereinafter, an embodiment of the present invention shall be described in detail with reference to the accompanying drawings.

FIG. 1A is a block diagram illustrating the entire configuration of a system including an analysis model generation apparatus 100 as an image processing apparatus according to an embodiment of the present invention.

This system is intended to acquire three-dimensional mesh models used for three-dimensional CAD model analysis. A simplified two-dimensional model as a simplified shape is generated by inputting a three-dimensional CAD model, extracting a cross-sectional two-dimensional model from the three-dimensional CAD model, and simplifying the cross-sectional two-dimensional model. Furthermore, the generated simplified two-dimensional model is converted into mesh form and transformed into three-dimensional form. However, the image processing apparatus of the present invention is not limited to simplifying three-dimensional models, and is applicable to all techniques that simplify two-dimensional shapes including a plurality of line elements.

<System Configuration>

An analysis model generation apparatus 100 includes a two-dimensional model generation section 102, a simplification parameter input section 103, a simplified two-dimensional model generation section 104, a simplified two-dimensional model modification section 105, a two-dimensional mesh model generation section 106, a three-dimensional transformation parameter input section 107, and a three-dimensional mesh model generation section 108. Furthermore, the analysis model generation apparatus 100 is connected to an input/output section 101 and to a database 109.

The input/output section 101 includes a display 101a as an output unit, and a keyboard 101b and a mouse 101c as input units. The two-dimensional model generation section 102 receives an input of a three-dimensional CAD model to be analyzed from the input/output section 101, generates a two-dimensional model, and registers the two-dimensional model in the database 109. The simplification parameter input section 103 inputs a simplification parameter that indicates the degree of simplification. This simplification parameter can be set freely by the user. The simplified two-dimensional model generation section 104 simplifies the two-dimensional model based on the simplification parameter inputted by the simplification parameter input section 103, and registers the simplified two-dimensional model in the database 109.

The simplified two-dimensional model modification section 105 displays, on the display 101a, the simplified two-dimensional model generated by the simplified two-dimensional model generation section 104, and modifies the simplified two-dimensional model based on an instruction inputted by the user with the keyboard 101b or the mouse 101c. The modified simplified two-dimensional model is registered in the database 109.

The two-dimensional mesh model generation section 106 generates a two-dimensional mesh model from the simplified two-dimensional model, and registers the two-dimensional mesh model in the database 109. The three-dimensional transformation parameter input section 107 inputs a three-dimensional transformation parameter used to transform the two-dimensional mesh model into three-dimensional form. The three-dimensional mesh model generation section 108 generates a three-dimensional mesh model based on the three-dimensional transformation parameter inputted by the three-dimensional transformation parameter input section 107. The obtained three-dimensional mesh model is registered in the database 109. The database 109 stores data of the three-dimensional model, the two-dimensional model, the simplified two-dimensional model, the modified two-dimensional model, the two-dimensional mesh model, and the three-dimensional mesh model, which are generated in the above-described manner, and performs reception and transmission of the data with each processing unit.

Next, a configuration of the simplified two-dimensional model generation section 104 shall be described in detail with reference to FIG. 1B. FIG. 1B is a block diagram illustrating an internal configuration of the simplified two-dimensional model generation section 104. The simplified two-dimensional model generation section 104 includes, as shown in FIG. 1B, a line segment extracting section 111, a reference direction setting section 112, a base endpoint setting section 113, a next endpoint setting section 114, a determination section 115, a correction endpoint generation section 116, a line segment generation section 117, a base endpoint change section 118, and a line segment combining section 119.

The line segment extracting section 111 extracts one line element included in a two-dimensional shape. For example, the longest line segment in the two-dimensional shape may be extracted. However, when the two-dimensional shape includes a plurality of line segments that are oriented in the same direction, it is preferable to extract one of the plurality of line segments. Also, a configuration may be adopted in which the user can freely set the extraction conditions. In this case, it is preferable to select conditions that maximize the effect of simplification for the line segment extraction.

The reference direction setting section 112 functions as a reference direction setting unit, and sets the direction of one line segment included in the input two-dimensional shape as a first reference direction, and a direction orthogonal to the first reference direction as a second reference direction. The base endpoint setting section 113 functions as a base endpoint setting unit, and sets one endpoint of the one line element included in the input two-dimensional shape as a base endpoint. The next endpoint setting section 114 functions as a next endpoint setting unit, and sets the other endpoint of a line element having the base endpoint as a next endpoint.

The determination section 115 functions as a determination unit, and determines whether or not the next endpoint is in the first reference direction, or the second reference direction, as viewed from the base endpoint. The correction endpoint generation section 116 generates, as a correction endpoint, a point obtained by projecting the next endpoint onto the straight line in the first reference direction that passes through the base endpoint or onto the straight line in the second reference direction that passes the base endpoint if the determination section 115 determines that the next endpoint is neither in the first nor second reference direction as viewed from the base endpoint. In other words, the correction endpoint generation section 116 functions as a correction endpoint generation unit. If the determination section 115 determines that the next endpoint is in the first reference direction or in the second reference direction as viewed from the base endpoint, the correction endpoint generation section 116 generates no correction endpoint.

The line segment generation section 117 generates a line segment between the base endpoint and the next endpoint or the correction endpoint. If the determination section 115 determines that the next endpoint is in the first reference direction or in the second reference direction as viewed from the base endpoint, the base endpoint change section 118 sets the next endpoint as a new base endpoint. If the determination section 115 determines that the next endpoint is neither in the first nor second reference direction as viewed from the base endpoint, the base endpoint change section 118 sets the correction endpoint as a new base endpoint. Then, the base endpoint change section 118 compares the newly set base endpoint with the base endpoint set by the base endpoint setting section 113. If they match, the base endpoint change section 118 causes the line segment combining section 119 to start its process.

The line segment combining section 119 combines a plurality of line segments generated by the line segment generation section 117, and registers the resultant in the database 109 as a simplified two-dimensional model.

FIG. 1C is a block diagram illustrating an internal configuration of the simplified two-dimensional model modification section 105. The simplified two-dimensional model modification section 105 includes a display section 121, a selection section 122, an input section 123, and a modification section 124.

The display section 121 retrieves the simplified two-dimensional model from the database 109, and displays the simplified two-dimensional model on the display 101a. The selection section 122 selects an endpoint included in the simplified two-dimensional model displayed by the display section 121 based on an instruction received through the keyboard 101b or the mouse 101c. The input section 123 inputs the position to which the endpoint selected by the selection section 122 is to be moved based on an instruction received through the keyboard 101b or the mouse 101c. The modification section 124 modifies the endpoint selected by the selection section 122 to the endpoint inputted by the input section 123. The endpoint selected by the selection section 122 and other unused points are deleted, and the modified simplified two-dimensional model is stored in the database 109.

<Mesh Model Generation Procedure>

Figure 2:
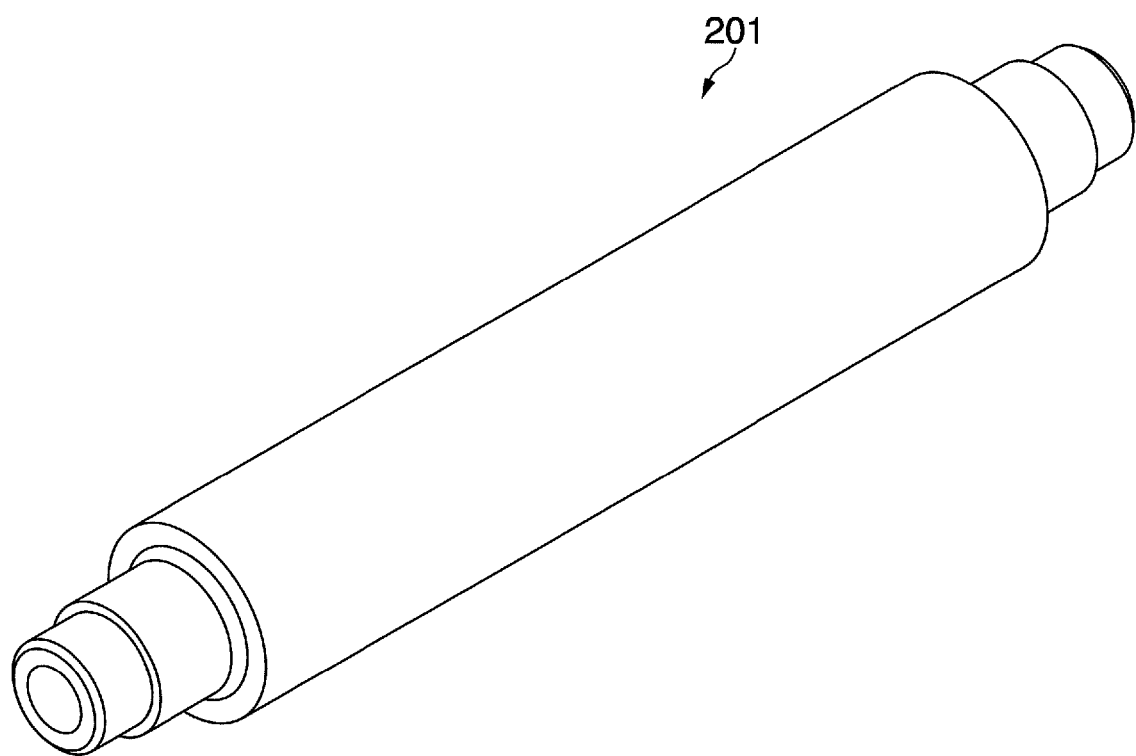
FIG. 2 is a perspective view of a roller 201.
Figure 3:
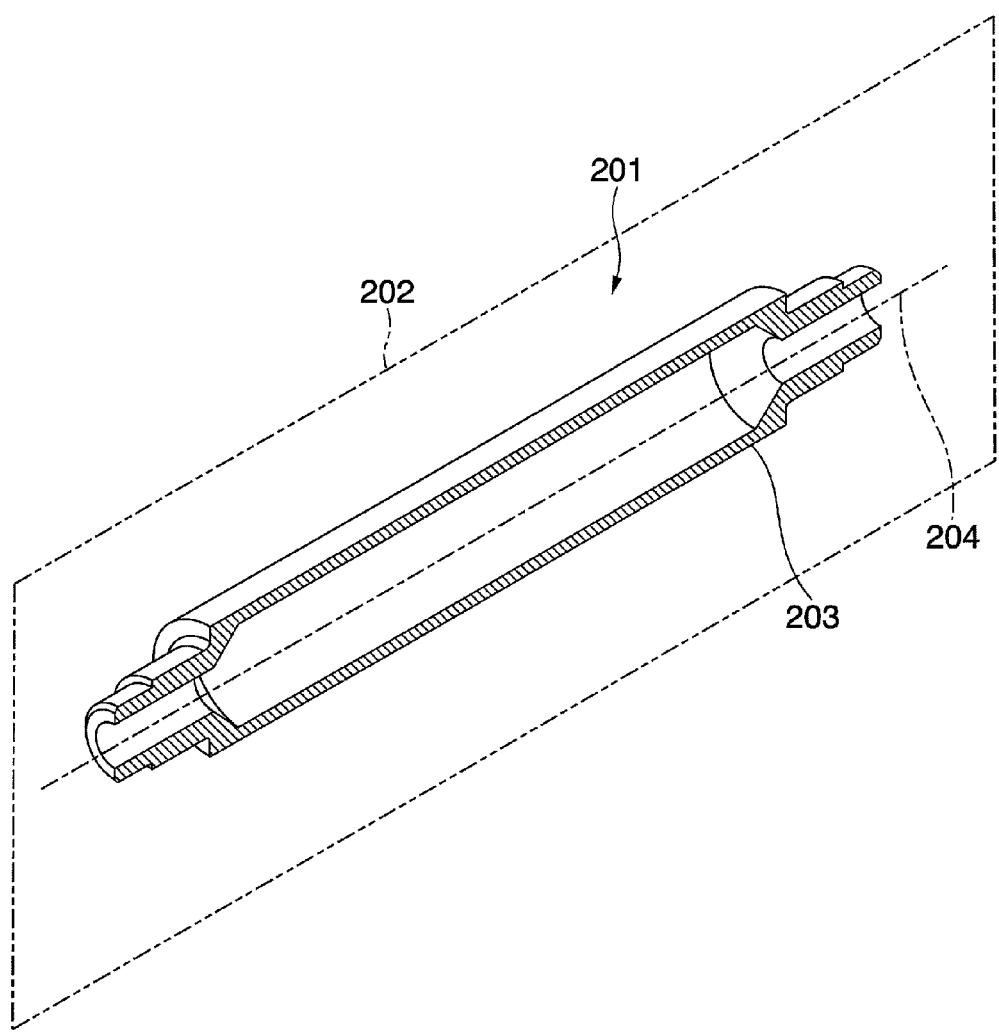
FIG. 3 is a diagram illustrating a cross section 203 that passes through the center axis 204 of the roller 201.

Next, a mesh model generation procedure of the present embodiment shall be described using, as an example, a roller 201 having an axially symmetric shape shown in FIGS. 2 and 3. FIGS. 5 to 7B are flowcharts illustrating a process flow of the mesh model generation procedure. FIGS. 9 to 17 are diagrams illustrating a specific model shape in each step.

Figure 4:
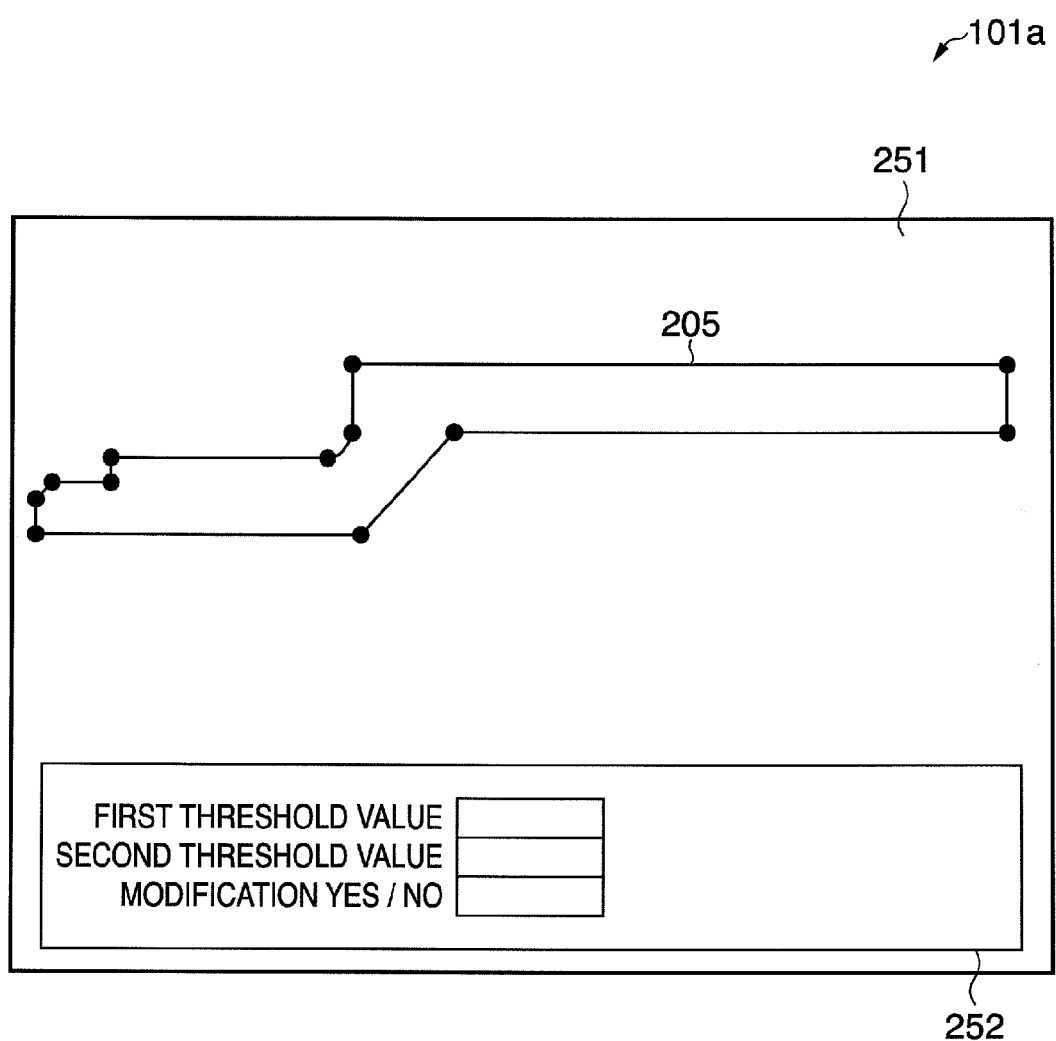
FIG. 4 is a diagram illustrating an input screen displayed by a simplification parameter input section 103.
Figure 5:
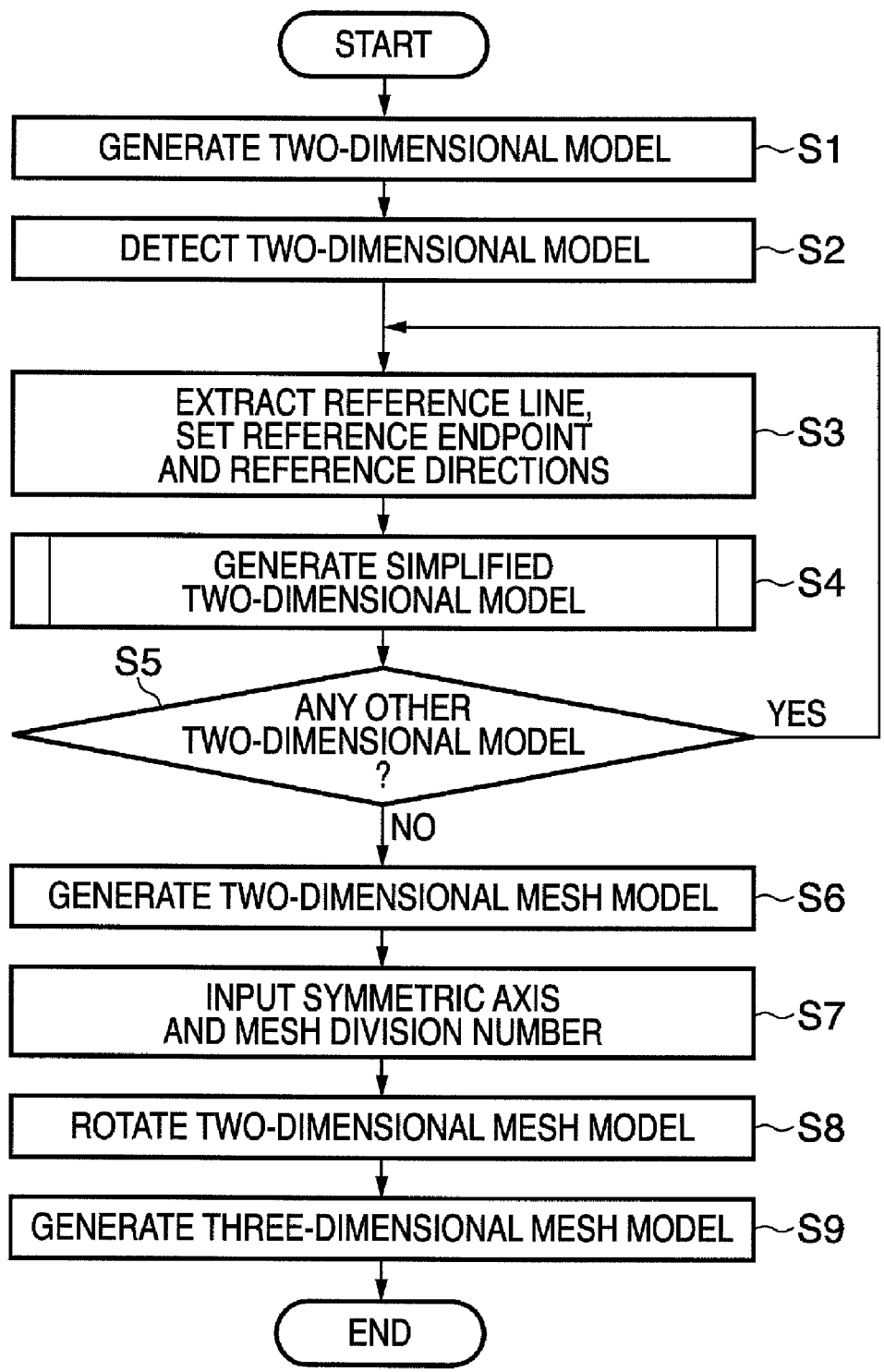
FIG. 5 is a flowchart illustrating an operation procedure of the analysis model generation apparatus 100.

FIG. 2 is a perspective view of a roller 201. FIG. 3 is a diagram illustrating a cross section 203 of the roller 201 that passes through the center axis 204. FIG. 4 is a diagram illustrating an input screen displayed by the simplification parameter input section 103. FIG. 5 is a flowchart illustrating an operation procedure performed by the analysis model generation apparatus 100.

Figure 9:
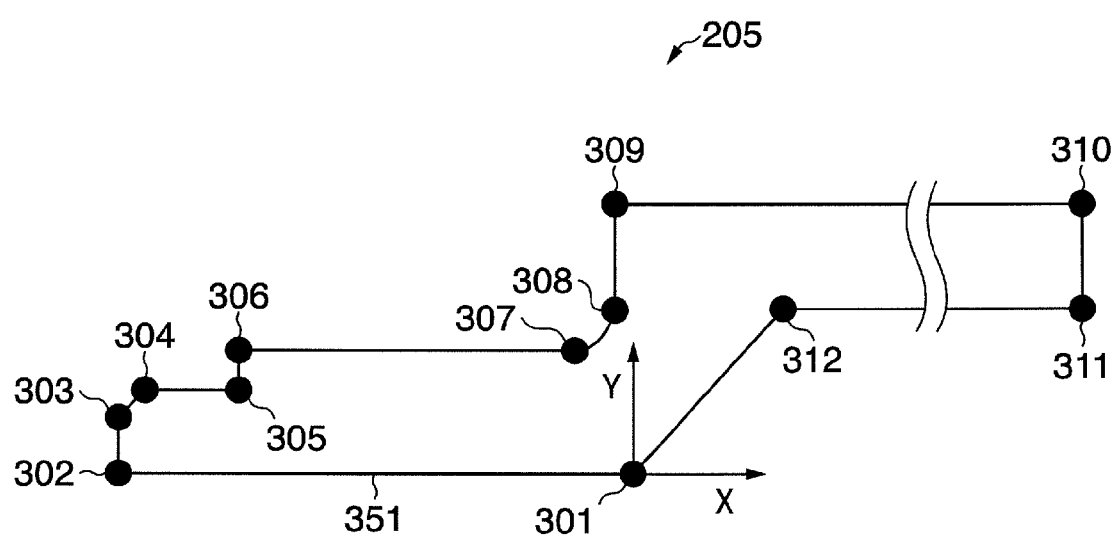

First, in step S1 of FIG. 5, a two-dimensional model is generated from a three-dimensional CAD model. More specifically, as shown in FIG. 3, a plane 202 passing through the center axis 204 is applied to a roller 201 as shown in FIG. 2 displayed by the display 101a, and a cross section 203 cut by this plane 202 is extracted. Then, a two-dimensional model 205 shown in FIG. 9 is generated from the cross section 203, and then stored in the database 109. Furthermore, the two-dimensional model 205 is read out from the database 109, and then displayed on the display 101a as shown in FIG. 4. The above process is performed based on the instructions from the user received through the keyboard 101b or the mouse 101c. The display screen of the analysis model generation apparatus 100 shown in FIG. 4 is divided into a model shape display area 251 and a parameter input area 252. In the parameter input area 252, the display content, which is displayed in an interactive manner, is changed for each step to prompt the user to input a necessary parameter or make a selection in the model shape display area 251. As shown in FIG. 3, the cross section 203 has an axial and left-right symmetric shape, so only a quarter of the shape is extracted as a two-dimensional model 205 as shown in FIG. 9.

If a plurality of two-dimensional models are generated in step S1, in step S2, one two-dimensional model, which is to be processed for simplification, is automatically selected from the plurality of two-dimensional models. In step S3, based on an instruction from the user through the keyboard 101b or the mouse 101c, a line segment serving as a reference (hereinafter referred to as "reference line") 351 and one endpoint (hereinafter referred to as "reference endpoint") 301 of the reference line are set in the two-dimensional model 205 as shown in FIG. 9. Furthermore, a direction including the reference line is set as a first reference direction X, and a direction orthogonal to the first reference direction X is set as a second reference direction Y.

Subsequently, in step S4, using the reference line 351, the reference endpoint 301, and the reference directions X and Y set in step S3, a simplified two-dimensional model 206, as shown in FIG. 15, is generated. Then, in step S5, a determination is made as to whether or not there is a two-dimensional model other than the two-dimensional model extracted in step S2. If it is determined that there is another two-dimensional model, this other two-dimensional model is subjected to the process from step S3, without changing the reference directions X and Y.

Figure 16:
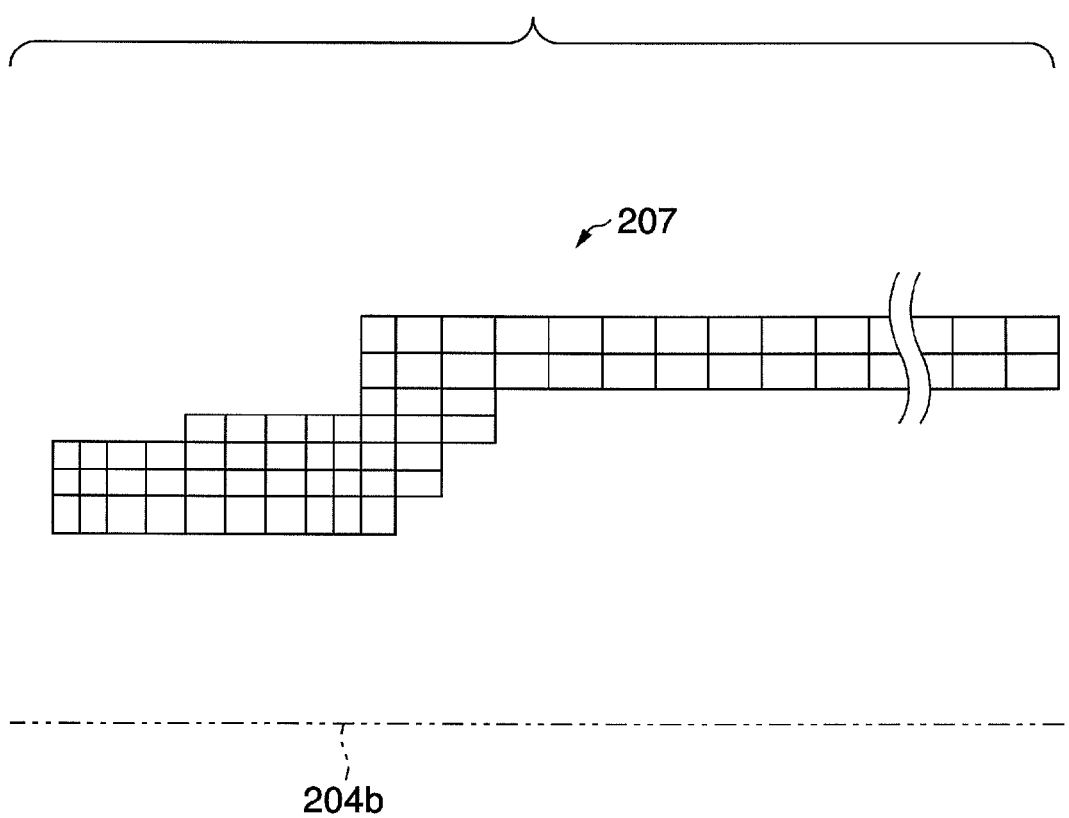

In step S6, based on the simplified two-dimensional model 206 generated in step S4, a two-dimensional mesh model 207, as shown in FIG. 16, is generated. The generation of the two-dimensional mesh model is performed according to a known automatic quadrilateral mesh generation procedure, so a detailed description thereof shall be omitted here. In this embodiment, because the simplified two-dimensional model, from which the mesh is generated, is formed with only line segments in the reference direction and those in the direction orthogonal to the reference direction, the quadrilateral mesh has a shape close to a square with little distortion, providing a mesh of high quality. As the mesh size, the value inputted in the parameter input area 252 by the user may be used, or an optimal value calculated automatically may be used.

In step S7, a symmetric axis and a mesh division number are inputted. Because the cross section 203 is left-right symmetric in shape, the symmetric axis is an axis 204a as shown in FIG. 15. The mesh division number is a value that indicates the density of the mesh. In step S8, the two-dimensional mesh model 207 shown in FIG. 16 is generated based on the symmetric axis 204a and the mesh division number inputted in step S7.

Figure 17:
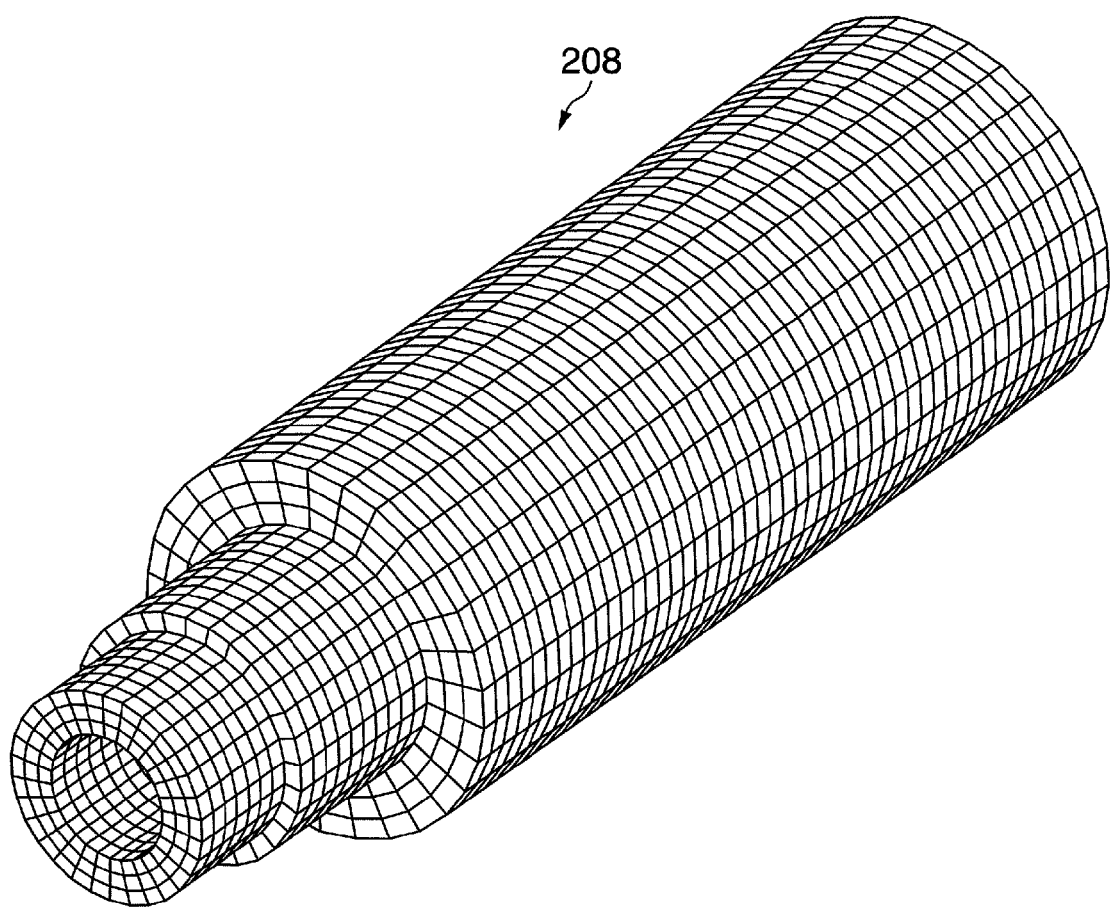

In step S9, the two-dimensional mesh model 207 displayed in the model shape display area 251 is rotated about the center rotation axis 204b of the original three-dimensional model. Furthermore, using the mesh division number in the rotation direction inputted in the parameter input area 252, a three-dimensional mesh model 208 as shown in FIG. 17 is generated, and then the processing is terminated. Although not described in this embodiment, the three-dimensional mesh model may be generated by rotating the two-dimensional mesh model in the vertical direction. In this case, the user inputs the rotation amount, the rotation direction, the mesh division number in the rotation direction, and the like, into the parameter input area 252.

Furthermore, it is also possible to combine a three-dimensional mesh model obtained by rotating the two-dimensional mesh model and a three-dimensional mesh model obtained by vertically rotating the two-dimensional mesh model into one three-dimensional mesh model.

Figure 6A:
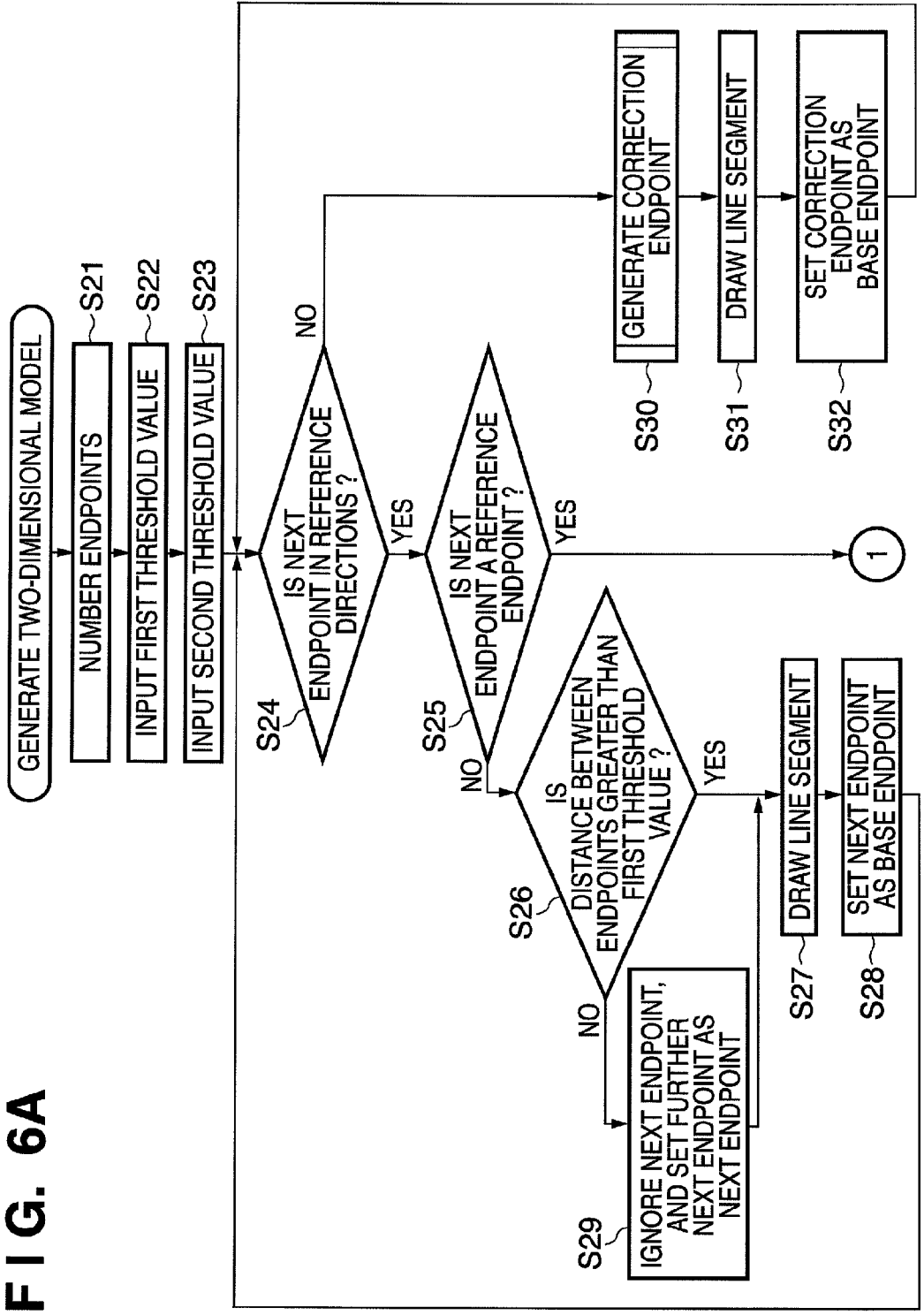
FIGS. 6A and 6B are detailed flowcharts of a two-dimensional model generation section 102.
Figure 6B:
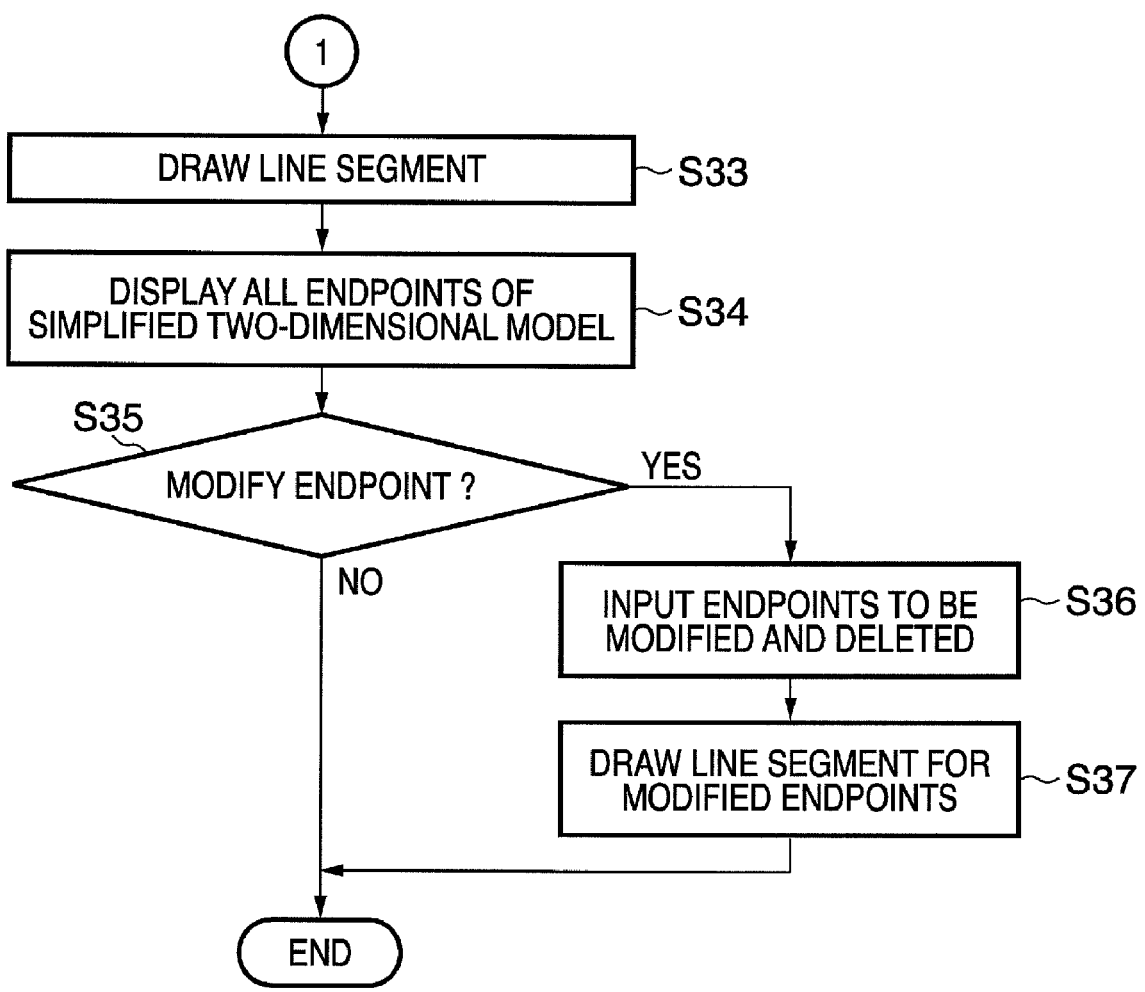

Next, the processing procedure in step S4 shall be described in detail with reference to FIGS. 6A and 6B. First, in step S21, a number is automatically assigned to each endpoint of the two-dimensional model in order from the reference endpoint 301. Numbers 1 to 12 are assigned to the endpoints 301 to 312, respectively.

In steps S22 and S23, a first threshold value and a second threshold value that indicate the degree of simplification are inputted. The first threshold value is to simplify those that are smaller than a specified size, and the second threshold value is to provide an endpoint if the distance between endpoints is not less than a specified size so as to prevent the simplified two-dimensional model from differing significantly from the model shape before simplification. In this embodiment, a configuration is adopted in which the first threshold value and the second threshold value are inputted by the user, but if the first threshold value and the second threshold value are preset, the user does not have to input the values. The second threshold value inputted in this step may be used as the mesh size in step S6 of FIG. 5.

Figure 10:
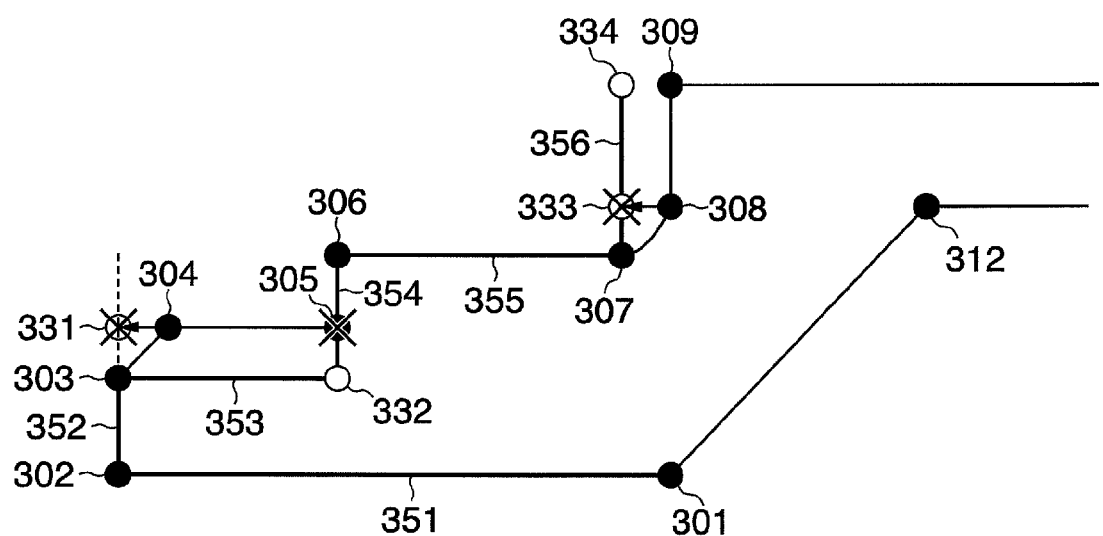

FIG. 10 is an enlarged view illustrating a part of FIG. 9. In step S24, determination is made as to whether or not a next endpoint 302 is in either of the reference directions X and Y as viewed from the base endpoint 301 shown in FIG. 10. In step S25, if the next endpoint 302 is determined to be in either of the reference directions X and Y, determination is made as to whether or not the next endpoint 302 is a reference endpoint. In step S25, if it is determined that the next endpoint is not a reference endpoint, the process proceeds to step S26, where determination is made as to whether or not the distance between the base endpoint 301 and the next endpoint 302 is greater than the first threshold value e. In step S26, if it is determined that the distance between the base endpoint 301 and the next endpoint 302 is greater than the first threshold value e, the process proceeds to step S27, where a line segment 351 is drawn between the base endpoint 301 and the next endpoint 302.

In step S28, the point defined as the next endpoint 302 is redefined as a base endpoint, then the process moves to step S24. In step S26, if it is determined that the distance between the base endpoint 301 and the next endpoint 302 is smaller than the first threshold value e, the process proceeds to step S29, where the other endpoint (further next endpoint) of a line element including the next endpoint 302 is set as a new next endpoint, then the process moves to step S27. In step S24, if it is determined that the next endpoint is in neither of the reference directions X and Y, the process proceeds to step S30, where a correction endpoint is generated in the position to which the next endpoint is projected to either of the reference directions X and Y, and this correction endpoint is set as a new next endpoint.

Figure 13:
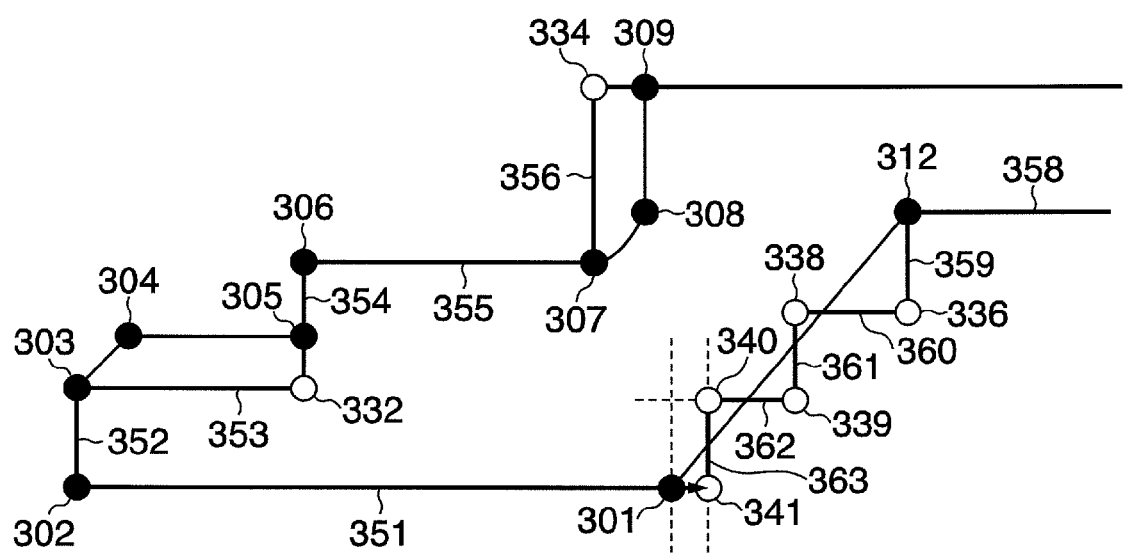

In step S31, a line segment is drawn between the next endpoint set in S30 and the base endpoint. In step S32, the next endpoint set in step S30 is set as a base endpoint, then the process moves to step S24. In step S25, if it is determined that the next endpoint is the same as the reference endpoint, the process proceeds to step S33, where a line segment is drawn between the base endpoint 341 and the next endpoint 301 as shown in FIG. 13.

In step S34, the simplified two-dimensional model and the endpoints and correction endpoints that were not used for the simplification are displayed in the model shape display area 251 of the display 101a. In step S35, determination is made as to whether or not the endpoints displayed in step S34 need to be modified. An input field is displayed in the parameter input area 252 of the display 101a, so that an input can be made to determine whether or not a modification is necessary for the endpoints.

In step S35, determination is made as to whether or not an instruction indicating that a correction is necessary is entered through the keyboard 101b or the mouse 101c. If it is determined that this instruction is entered in step S35, the process proceeds to step S36, where the endpoints are displayed in the model shape display area 251 such that a selection can be made, and the endpoints to be modified and the endpoints to be deleted are inputted through the keyboard 101b or the mouse 101c. In step S37, line segments are drawn based on the instructions inputted in step S36.

Figure 14B:
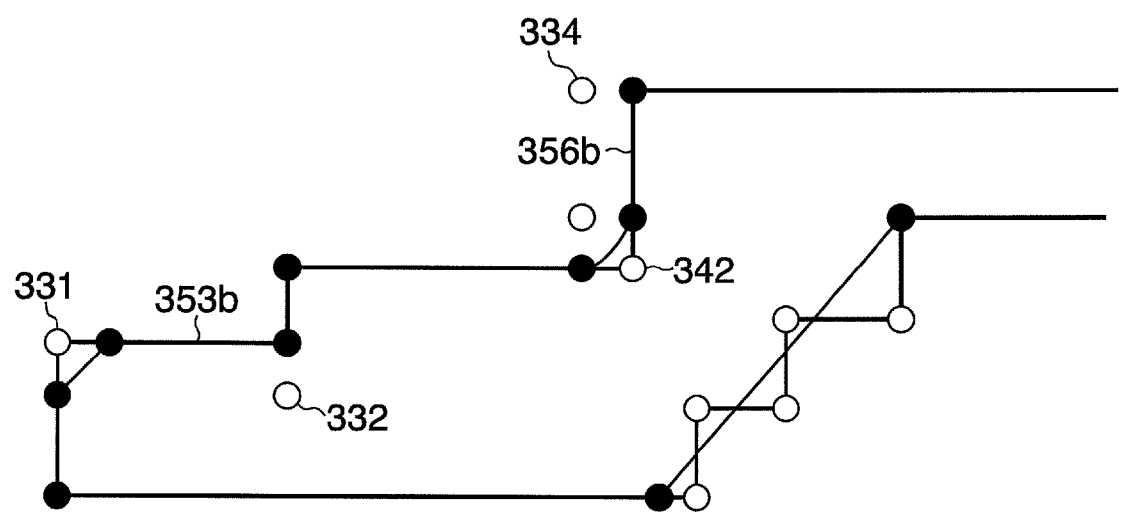

The modification processing described above is performed, for example, as follows. As shown in FIG. 14A, a correction endpoint 332 and a correction endpoint 331 are selected sequentially. Thereby, as shown in FIG. 14B, the line segment 353 is modified to a line segment 353b, and the simplified two-dimensional shape is modified. Also, a correction endpoint 333 to which an endpoint 308 is projected in the reference direction Y and a correction endpoint 342 to which the endpoint 308 is projected in the reference direction X are generated simultaneously. By selecting a correction endpoint 334 and the correction endpoint 342 sequentially, as shown in FIG. 14B, a line segment 356 is modified to a line segment 356b. Although not described in this embodiment, deletion of endpoints can be performed in the same manner.

Figure 7A:
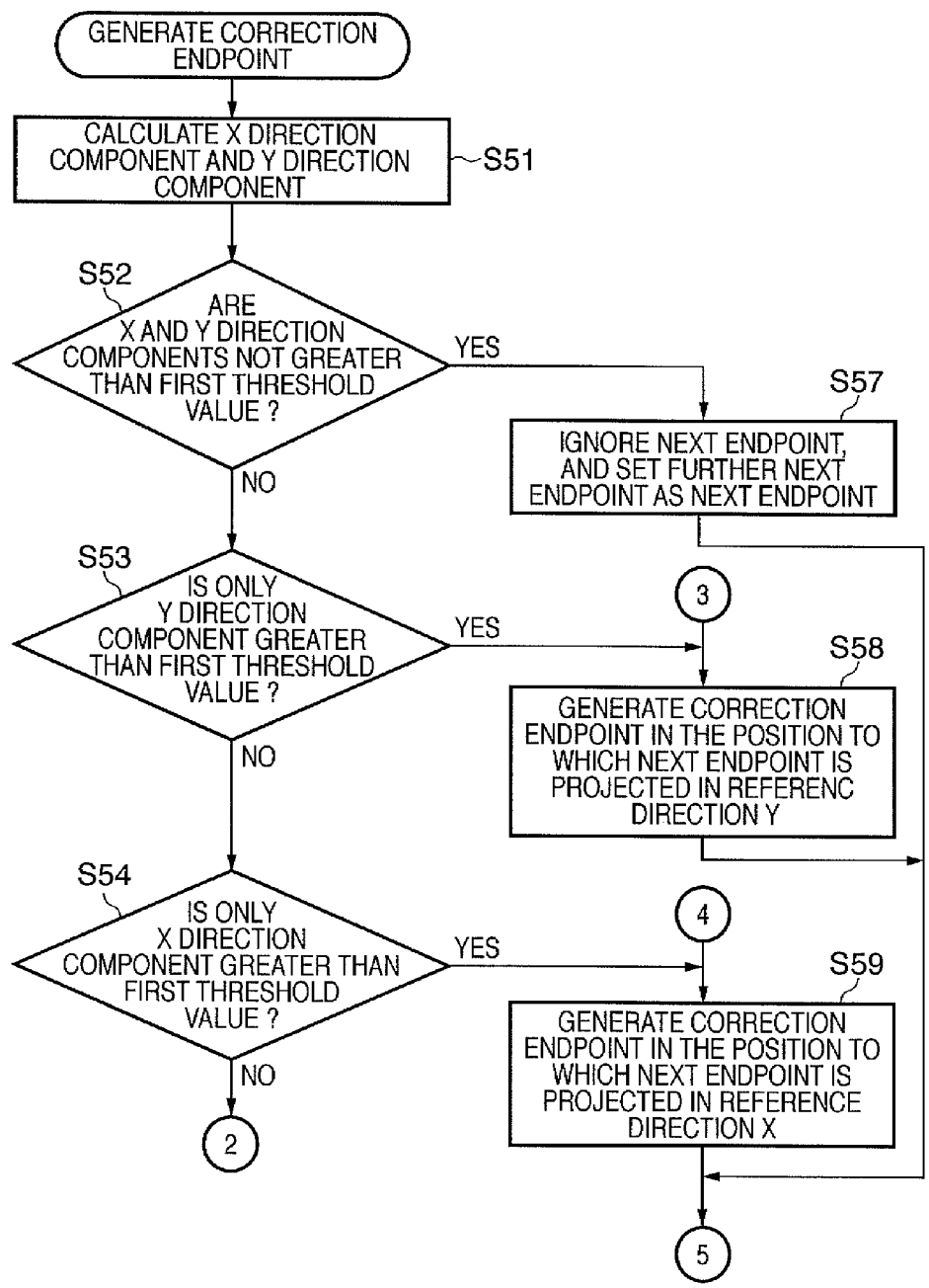
FIGS. 7A and 7B are detailed flowcharts illustrating the processing procedure of step S30 of FIG. 6A.
Figure 7B:
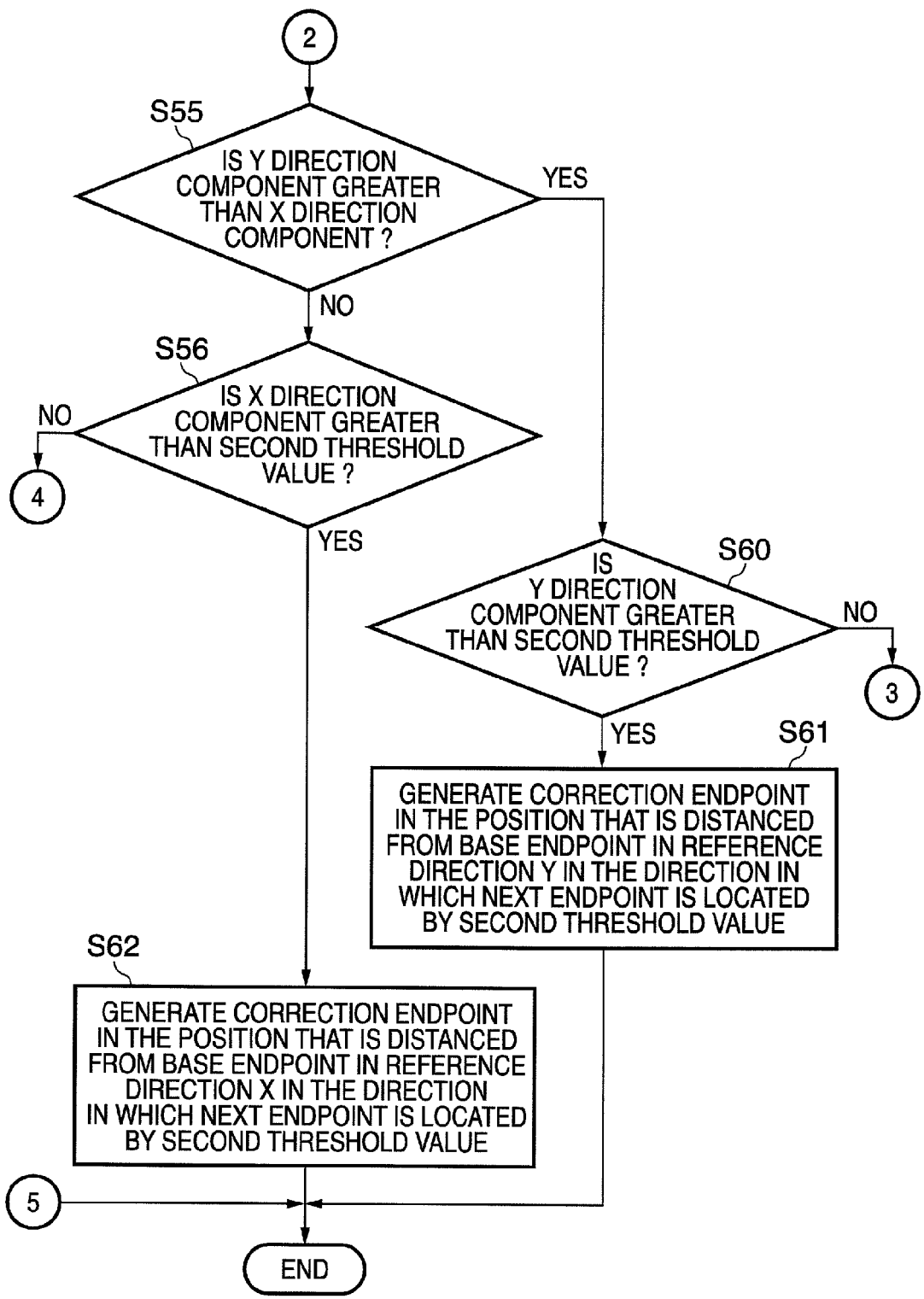
Figure 8:
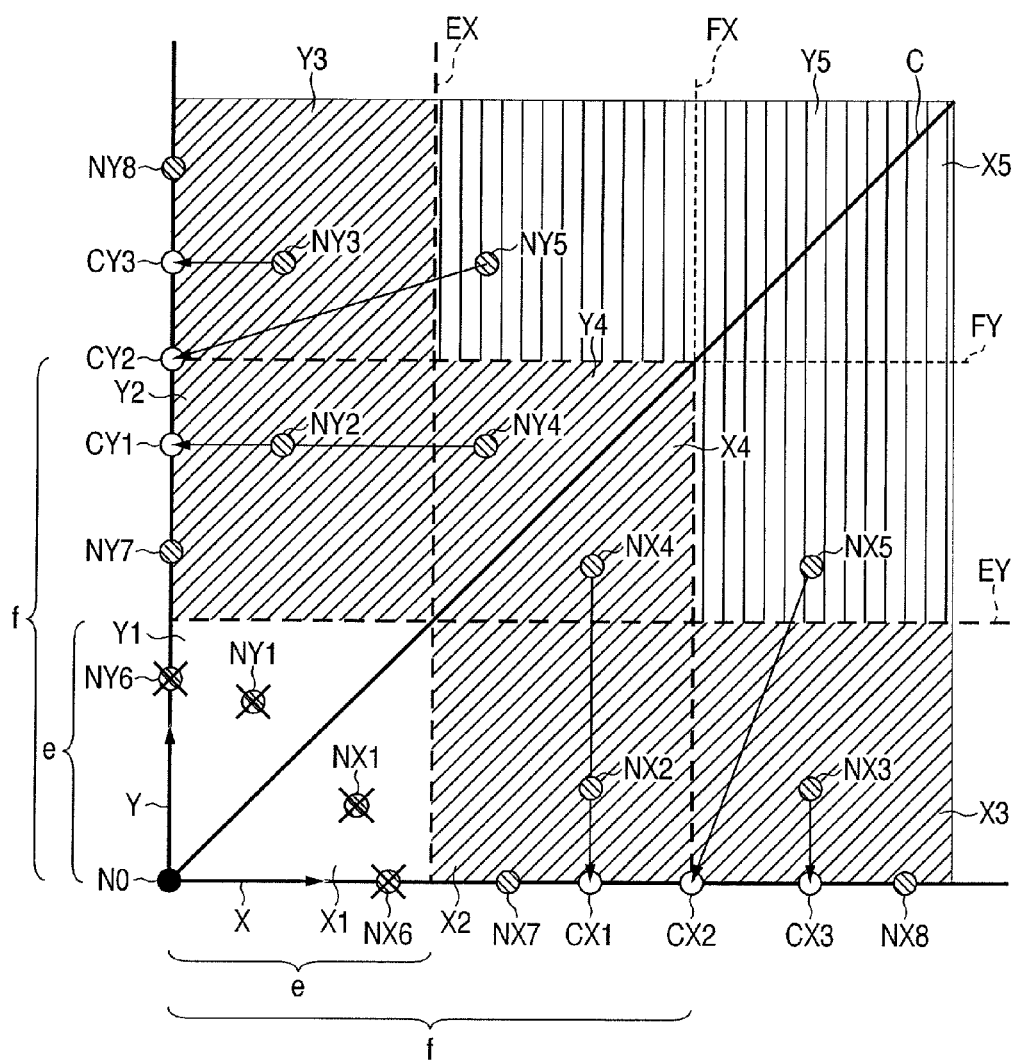
FIG. 8 is a diagram schematically illustrating the processing procedure of a correction endpoint generation section 116.

Next, step S30 shall be described in detail with reference to FIGS. 7A, 7B and 8. FIGS. 7A and 7B are detailed flowcharts illustrating the processing procedure of step S30 of FIG. 6A. FIG. 8 is a diagram schematically illustrating the processing procedure of the correction endpoint generation section 116. Although FIG. 8 illustrates only the first quadrant, the same applies to the second to fourth quadrants.

With the base endpoint NO set as the origin point, and the axes as the reference directions X and Y, a straight line C that forms an oblique angle of 45° with the reference directions X and Y is defined. Furthermore, straight lines EX and EY that are parallel to the reference direction X and Y, respectively, and are distanced from the origin point by a first threshold value e are defined. Straight lines FX and FY that are parallel to the reference directions X and Y, respectively, and are distanced from the origin point by a second threshold value f are defined. The X-Y plane is divided by these straight lines into regions X1 to X5 and regions Y1 to Y5. Next endpoint candidates that are located in the regions are designated as NX1 to NX5 and NY1 to NY5. Next endpoint candidates that are located on the reference directions X and Y are designated as NX6 to NX8 and NY6 to NY8.

First, in step S51, an X direction component and a Y direction component, which are the components in the reference directions X and Y of a next endpoint, are calculated. Subsequently, in step S52, determination is made as to whether or not the X direction component and the Y direction component of the next endpoint candidate are not greater than a first threshold value e. In FIG. 8, determination is made as to whether or not a next endpoint candidate is in the region X1 or Y1.

In step S52, if it is determined that the X direction component and the Y direction component of the next endpoint candidate are not greater than the first threshold value e, the process proceeds to step S57, where the next endpoint candidate is ignored, and a further next endpoint is set as a next endpoint. In FIG. 8, the next endpoint candidate NX1 located in the region X1 and the next endpoint candidate NY1 located in the region Y1 are ignored. This prevents the generation of line segments having a size not greater than the specified first threshold value e, simplifying the shape. In step S52, if it is determined that the X direction component and the Y direction component of the next endpoint candidate are greater than the first threshold value e, the process proceeds to step S53, where determination is made as to whether or not only the Y direction component is greater than the first threshold value e. In FIG. 8, determination is made as to whether or not the next endpoint candidate is in the region Y2 or Y3.

In step S53, if it is determined that only the Y direction component of the next endpoint candidate is greater than the first threshold value e, the process proceeds to step S58, where a correction endpoint is generated in the position to which the next endpoint candidate is projected onto the reference direction Y, and the correction endpoint is set as a next endpoint. In FIG. 8, correction endpoints CY1 and CY3 are generated respectively in the positions to which the next endpoint candidate NY2 located in the region Y2 and the next endpoint candidate NY3 located in the region Y3 are respectively projected onto the reference direction Y. In step S53, if it is not determined that only the Y direction component of the next endpoint candidate is greater than the first threshold value e, the process proceeds to step S54, where determination is made as to whether or not the X direction component of the next endpoint candidate is greater than the first threshold value. In FIG. 8, determination is made as to whether or not the next endpoint candidate is in the region X2 or X3.

In step S54, if it is determined that only the X direction component of the next endpoint candidate is greater than the first threshold value e, the process proceeds to step S59, where a correction endpoint is generated in the position to which the next endpoint candidate is projected onto the reference direction X, and the correction endpoint is set as a next endpoint. In FIG. 8, correction endpoints CX1 and CX3 are generated respectively in the positions to which the next endpoint candidate NX2 located in the region X2 and the next endpoint candidate NX3 located in the region X3 are respectively projected onto the reference direction X. Through this, the X and Y direction components not greater than the specified first threshold value e are ignored, and correction endpoints to which the components greater than the first threshold value e are projected are generated. In step S54, if it is not determined that only the X direction component of the next endpoint candidate is greater than the first threshold value e, the process proceeds to step S55, where determination is made as to whether or not the Y direction component is greater than the X direction component. In FIG. 8, determination is made as to whether or not the next endpoint candidate is in the region X4 or X5, or, alternatively, in the region Y4 or Y5.

In step S55, if it is determined that the Y direction component of the next endpoint candidate is greater than the X direction component, the process proceeds to step S60, where determination is made as to whether or not the Y direction component is greater than the second threshold value f. In FIG. 8, determination is made as to whether or not the next endpoint candidate is in either of the region Y4 or Y5. In step S60, if it is determined that the Y direction of the next endpoint candidate is greater than the second threshold value f, the process proceeds to step S61, where a correction endpoint is generated in the position that is distanced from the base endpoint in the reference direction Y in the direction in which the next endpoint is located by the second threshold value f, and the correction endpoint is set as a next endpoint. In FIG. 8, the next endpoint candidate NY5 located in the region Y5 is projected to the position that is distanced from the base endpoint NO in the reference direction Y in the direction in which the next endpoint is located by the second threshold value f to generate a correction endpoint CY2. Conversely, if it is determined in step S60 that the Y direction component of the next endpoint candidate is not greater than the second threshold value f, the process moves to step S58. In FIG. 8, the next endpoint candidate NY4 satisfies this condition.

In step S55, if it is determined that the Y direction component of the next endpoint candidate is not greater than the X direction component, the process proceeds to step S56, where determination is made as to whether or not the X direction component of the next endpoint candidate is greater than the second threshold value f. In FIG. 8, determination is made as to whether the next endpoint candidate is in either the region X4 or X5. In step S56, if it is determined that the X direction component of the next endpoint candidate is greater than the second threshold value f, the process proceeds to step S62, where a correction endpoint is generated in the position that is distanced from the base endpoint in the reference direction X in the direction in which the next endpoint is located by the second threshold value f, and the correction endpoint is set as a next endpoint. In FIG. 8, the next endpoint candidate NX5 located in the region X5 is projected to the position that is distanced from the base endpoint NO in the reference direction X in the direction in which the next endpoint is located by the second threshold value f to generate a correction endpoint CX2, and the correction endpoint CX2 is set as a next endpoint. Conversely, if it is determined in step S56 that the X direction component of the next endpoint candidate is smaller than the second threshold value f, the process moves to step S59. In FIG. 8, the next endpoint NX4 satisfies this condition.

Figure 11:
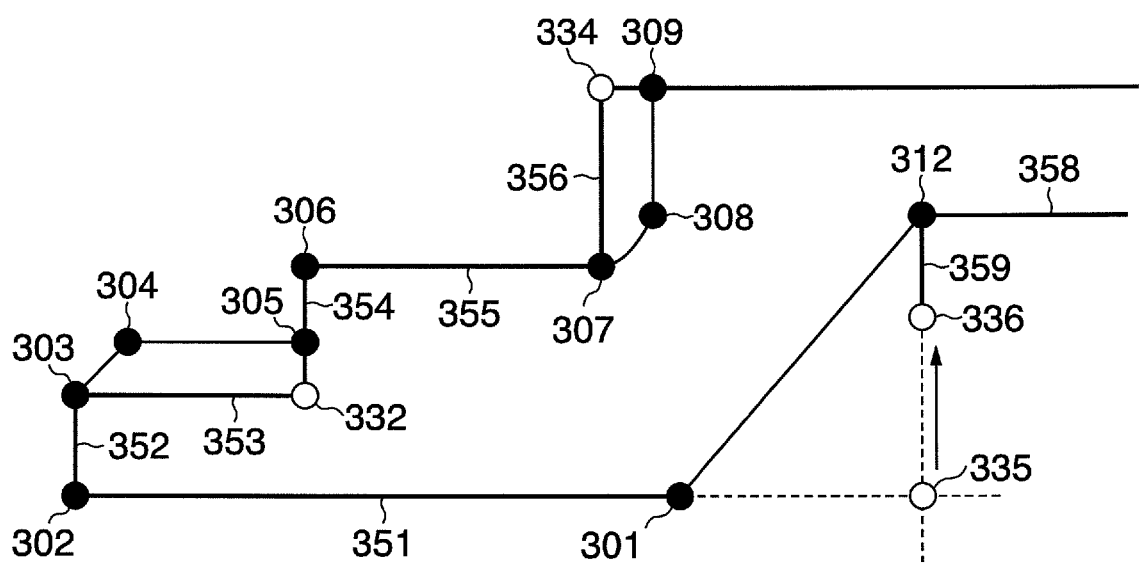
Figure 12:
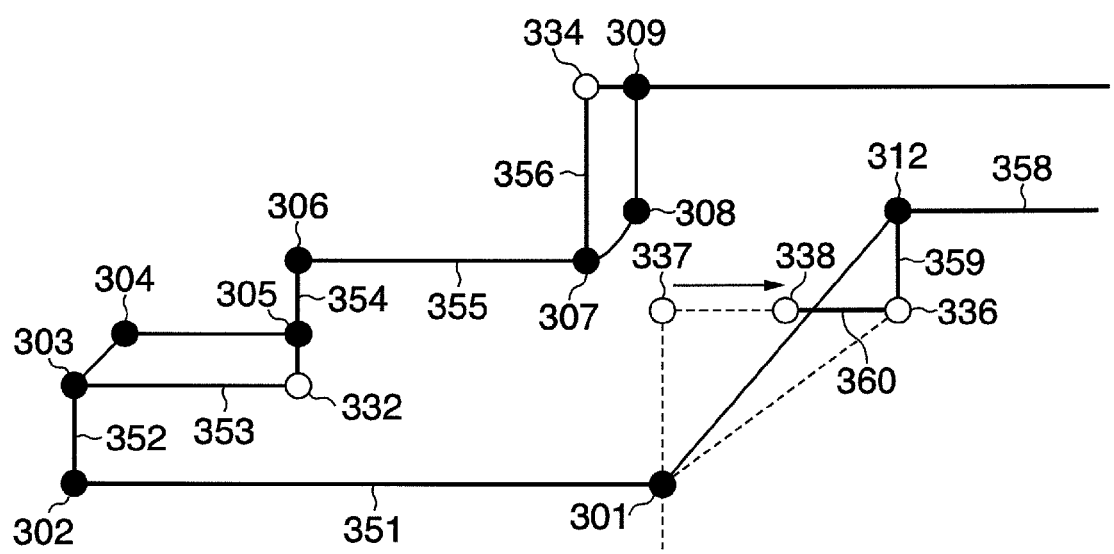

The process in steps S61 and S62 is performed when the distance between the base endpoint 312 and the next endpoint 301 is large, and the two-dimensional model and the simplified two-dimensional model will differ significantly from each other if a correction endpoint 335 is generated by simple projection in the reference direction X. First, as shown in FIG. 11, instead of generating a correction endpoint 335 by simply projecting the base endpoint 312 in the reference direction X in the direction in which the next endpoint 301 is located, a correction endpoint 336 is generated in the position that is distanced from the base endpoint 312 by a distance of the second threshold value, and the correction endpoint 336 is set as a base endpoint 336. Subsequently, as shown in FIG. 12, instead of generating a correction endpoint 337 by simply projecting the base endpoint 336 in the reference direction Y in the direction in which the next endpoint 301 is located, a correction endpoint 338 is generated in the position that is distanced from the base endpoint 336 by a distance of the second threshold value, and the correction endpoint 338 is set as a base endpoint. This process is repeated, through this, line segments are generated between the endpoint 312 and the endpoint 301. It should be noted that because the distance from the base endpoint to the endpoint generated by simple projection in the reference direction X, Y gradually comes together, correction endpoints are generated according to the procedure for generating correction endpoints shown in FIG. 8.

As described above, according to the present invention, line segments can be generated in two reference directions X and Y, so it is possible to simplify a two-dimensional shape in a simple and easy manner.

Other Embodiments

The embodiment of the present invention has been described in detail above. The present invention may be applied in a system configured with a plurality of devices, or may be applied in an apparatus configured with a single device.

It should be noted that the present invention can also be achieved by directly or remotely supplying a program that realizes the function of the above-described embodiment to a system or apparatus, and reading out and executing the supplied program code with the system or apparatus. Accordingly, the program code itself, which is installed on a computer to realize the functional processing of the present invention on the computer, also falls within the technical scope of the present invention.

In this case, the program may take any form as long as the program has the program function, such as an object code, a program executed by an interpreter, or script data to be supplied to an OS.

Examples of the recording media for supplying the program include floppy (registered trademark) disks, hard disks, optical disks, and optomagnetic disks. Other possibilities include MOs, CD-ROMs, CD-Rs, CD-RWs, magnetic tape, nonvolatile memory cards, ROMs, and DVDs (DVD-ROMs and DVD-Rs).

In addition, it is also possible to connect to an Internet website using the client PC browser and then to download the program according to the present invention, or a file that further includes an automatic installation function, onto a recording medium such as a hard disk. It is also possible to divide the program code that forms the program according to the present invention into a plurality of files and then to download each of the files from different websites. In other words, a WWW server that allows a plurality of users to download the program for realizing the functional processing of the present invention on a computer also falls within the scope of the present invention.

In addition, the program according to the present invention may be encrypted, stored in a recording medium such as a CD-ROM, and distributed to a user. In this case, a user that has satisfied a predetermined condition is allowed to download key information for removing the cryptography from a homepage via the Internet, execute the encrypted program using the key information, and install the program on a computer.

It is also possible that the OS or the like that is running on a computer performs some or all of the actual processing based on an instruction from the program, thereby achieving the function of the embodiment described above.

Furthermore, a case in which the program according to the present invention is written into a memory included in a PC function expansion unit, and based on the program, the CPU or the like that is included in the function expansion unit performs some or all of the actual processing, also falls within the scope of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-343496, filed on Dec. 20, 2006, which is hereby incorporated by reference herein in its entirety.

What is claimed is:

1. An image processing apparatus that simplifies a two-dimensional shape including a plurality of line elements, the apparatus comprising:
   a base endpoint setting unit that sets one endpoint of one line element included in the two-dimensional shape as a base endpoint;
   a next endpoint setting unit that sets a second endpoint of the line element including the base endpoint as a next endpoint;
   a determination unit that determines whether or not the next endpoint is in a first reference direction passing through the base endpoint, or in a second reference direction orthogonal to the first reference direction;
   a correction endpoint generation unit that generates, as a correction endpoint, a point obtained by projecting the next endpoint onto a straight line of the first reference direction passing through the base endpoint or onto a straight line of the second reference direction passing through the base endpoint in the case where the determination unit determines that the next endpoint is neither in the first reference direction nor in the second reference direction which passes through the base endpoint; and
   a base endpoint change unit that sets the next endpoint as a new base endpoint in the case where the determination unit determines that the next endpoint is in the first reference direction or in the second reference direction which passes through the base endpoint, and sets the correction endpoint as a new base endpoint in the case where the determination unit determines that the next endpoint is neither in the first reference direction nor in the second reference direction which passes through the base endpoint,
   wherein each endpoint of the plurality of line elements included in the two-dimensional shape is subjected to the process performed by the next endpoint setting unit, the determination unit, the correction endpoint generation unit, and the base endpoint change unit so as to generate a simplified shape.

2. The image processing apparatus according to claim 1, further comprising a reference direction setting unit that sets a direction including one line segment included in the plurality of line elements as the first reference direction, and a direction orthogonal to the first reference direction as the second reference direction.

3. The image processing apparatus according to claim 1, wherein the correction endpoint generation unit generates the correction endpoint on the straight line of either of the first reference direction passing through the base endpoint and the second reference direction passing through the base endpoint that is positioned closer to the next endpoint.

4. The image processing apparatus according to claim 1, wherein in the case where components of the first reference direction and the second reference direction of the next endpoint are not greater than a first threshold value, the next endpoint setting unit sets the second endpoint of the line element including the next endpoint as a new next endpoint, even in the case where the determination unit determines that the next endpoint is neither in the first reference direction nor the second reference direction which passes through the base endpoint.

5. The image processing apparatus according to claim 1, wherein in the case where the determination unit determines that the next endpoint is neither in the first reference direction passing through the base endpoint nor in the second reference direction orthogonal to the first reference direction, and
  in the case where the first reference direction component of the next endpoint is greater than a second threshold value, and the second reference direction component of the next endpoint is greater than the first threshold value, or in the case where the first reference direction component of the next endpoint is greater than the first threshold value, and the second reference direction component of the next endpoint is greater than the second threshold value,
  the correction endpoint generation unit changes either the larger of the first reference direction component and the second reference direction component of the next endpoint to the second threshold value to generate a point, and sets the point as the correction endpoint.

6. The image processing apparatus according to claim 1, further comprising:
  a display unit that displays the simplified shape;
  a selection unit that selects an endpoint included in the simplified shape displayed by the display unit;
  an input unit that inputs the position to which the endpoint selected by the selection unit is to be moved; and
  a modification unit that modifies the simplified shape by moving the endpoint selected by the selection unit to the position inputted by the input unit.

7. The image processing apparatus according to claim 1, further comprising:
  a display unit that displays the simplified shape;
  a selection unit that selects an endpoint included in the simplified shape displayed by the display unit; and
  a modification unit that deletes an endpoint selected by the selection unit and modifies the simplified shape.

8. An image processing method for simplifying a two-dimensional shape including a plurality of line elements, the method comprising:
  a base endpoint setting step of setting one endpoint of one line element included in the two-dimensional shape as a base endpoint;
  a next endpoint setting step of setting a second endpoint of the line element including the base endpoint as a next endpoint;
  a determination step, performed by a computer, of determining whether or not the next endpoint is in a first reference direction passing through the base endpoint or in a second reference direction orthogonal to the first reference direction;
  a correction endpoint generation step of generating, as a correction endpoint, a point obtained by projecting the next endpoint onto a straight line of the first reference direction passing through the base endpoint or onto a straight line of the second reference direction passing through the base endpoint in the case where it is determined in the determination step that the next endpoint is neither in the first reference direction nor in the second reference direction which passes through the base endpoint; and
  a base endpoint change step of setting the next endpoint as a new base endpoint in the case where it is determined in the determination step that the next endpoint is in the first reference direction or in the second reference direction which passes through the base endpoint, and setting the correction endpoint as a new base endpoint in the case where it is determined in the determination step that the next endpoint is neither in the first reference direction nor in the second reference direction which passes through the base endpoint,
  wherein each endpoint of the plurality of line elements included in the two-dimensional shape is subjected to the process performed by the next endpoint setting step, the determination step, the correction endpoint generation step and the base endpoint change step so as to generate a simplified shape.

9. A computer program stored on a non-transitory computer-readable recording medium that causes a computer to execute each step according to claim 8 by having the computer to read and execute the program.

* * * * *